Patented Aug. 13, 1935

2,010,870

UNITED STATES PATENT OFFICE 2,010,870

PROCESS FOR RECOVERING ELEMENTARY SELENIUM

Axel Rudolf Lindblad, Djursholm, Sweden

No Drawing. Application June 13, 1934, Serial No. 730,533. In Sweden September 4, 1933

3 Claims. (Cl. 23—209)

The present invention relates to a new process for recovering elementary selenium in the treatment of anode sludge or slime containing gold, silver and selenium derived from copper electrolysis.

The best way to separate the selenium from the anode sludge is to roast it with some alkali compound, e. g. soda, so that the selenium is oxidized and converted into alkaline selenate or selenite, which can easily be washed with water. To recover metallic selenium in the ordinary way from the solution containing selenium thus obtained by acidification with hydrochloric acid and reduction with sulphur dioxide, has, however, been found troublesome and uneconomical, and the leaching or washing liquor as a rule has to be led away, thus wasting it. The present invention has for object a method which makes the recovery easy and economical.

According to the present invention the anode sludge is roasted in the ordinary way with soda (sodium carbonate) or some other alkaline compound, so that alkaline selenite or respectively selenate is formed. The mass obtained is leached or washed with water and filtered, whereupon the saline solution is evaporated to a suitable degree, as a rule to dryness. The salt thus obtained is then mixed with carbon or carbonaceous material, preferably charcoal, and heated so that any selenium compounds in the same, or, at least the bulk of it, are converted into alkali selenides. After this reducing treatment the alkali fusion is washed with water. After the solution obtained has been filtered for removing carbon particles and other impurities, it is treated with air, gaseous oxygen or some other oxidizing agent. Thereby the alkali selenide is decomposed in such a manner that the selenium is precipitated in an elementary form and can be recovered by filtration, washed and dried in the ordinary way. The lye or liquor left after precipitation, which chiefly consists of an alkali or an alkali salt, is then evaporated to a suitable degree and returned to the process for roasting fresh quantities of anode slime. According to this process there is recovered not only the selenium but also the bulk of the alkali used for roasting the anode slime.

When washing the selenium obtained by precipitation it is advisable to add some hydrochloric acid or some other acid in order to remove by this means more safely every trace of alkali. As a rule it is possible in this process including washing, to produce a product containing 99–99.5% Se. A further, even if trifling, improvement in quality can be attained by smelting the pulverulent selenium obtained by washing. Any impurities present in the mass will then float to the top and can be skimmed off.

Having thus described my invention I declare that what I claim is:—

1. Process for recovering elementary selenium in the treatment of anode slime obtained in copper electrolysis, and containing gold, silver and selenium, comprising roasting the anode slime with an alkali compound, to form one of the compounds, alkali selenite, alkali selenate, leaching same with water, evaporating the saline solution, mixing the salt obtained through evaporation with a carbonaceous material and heating it to convert the selenium content into alkali selenide, dissolving the mass obtained by the reducing treatment in water, decomposing the alkali selenide and precipitating the selenium in an elementary form with the aid of an oxidizing agent, separating same by filtering, evaporating the solution obtained from filtration, chiefly containing alkali or respectively alkaline salt, and reintroducing same into the process.

2. Process according to claim 1, characterized by subjecting the selenium obtained by precipitation to washing and in so doing, adding suitable acid in order to make more sure of removing the alkali.

3. Process according to claim 1, charactesized by washing and smelting the precipitated selenium, which has been separated by filtration.

AXEL RUDOLF LINDBLAD.